United States Patent
Suumäki et al.

(10) Patent No.: US 6,847,610 B1
(45) Date of Patent: Jan. 25, 2005

(54) METHOD FOR OPTIMIZING DATA TRANSMISSION IN A PACKET SWITCHED WIRELESS DATA TRANSMISSION SYSTEM

(75) Inventors: Jan Suumäki, Tampere (FI); Juha Kalliokulju, Vesilahti (FI)

(73) Assignee: Nokia Mobile Phones Ltd., Espoo (FI)

( * ) Notice: Subject to any disclaimer, the term of this patent is extended or adjusted under 35 U.S.C. 154(b) by 679 days.

(21) Appl. No.: 09/649,770

(22) Filed: Aug. 28, 2000

(30) Foreign Application Priority Data

Aug. 30, 1999 (FI) ............................................. 19991834

(51) Int. Cl.[7] .................................................. H04J 3/16
(52) U.S. Cl. ..................... 370/230.1; 370/352; 370/468
(58) Field of Search ................................ 370/229–232, 370/342, 465, 468, 329, 352

(56) References Cited

U.S. PATENT DOCUMENTS

| | | | |
|---|---|---|---|
| 6,347,091 B1 * | 2/2002 | Wallentin et al. ............ | 370/437 |
| 6,374,112 B1 * | 4/2002 | Widegren et al. ......... | 455/452.2 |
| 6,438,122 B1 * | 8/2002 | Monrad et al. .............. | 370/349 |
| 6,542,465 B1 * | 4/2003 | Wang .......................... | 370/232 |
| 6,553,006 B1 * | 4/2003 | Kalliokulju et al. ......... | 370/310 |
| 6,560,231 B1 * | 5/2003 | Kawakami et al. ..... | 370/395.43 |

FOREIGN PATENT DOCUMENTS

| | | |
|---|---|---|
| EP | 1 017 207 A1 | 7/2000 |
| WO | WO 98/53576 | 11/1998 |
| WO | WO 99/05828 | 2/1999 |
| WO | WO 99/12302 | 3/1999 |
| WO | WO 99/16266 | 4/1999 |
| WO | WO 99/41872 | 8/1999 |
| WO | WO 99/48310 | 9/1999 |

* cited by examiner

*Primary Examiner*—Min Jung
(74) *Attorney, Agent, or Firm*—Perman & Green, LLP

(57) ABSTRACT

The invention relates to a method for optimizing the transfer of information between one or more applications run in a mobile terminal (MT) and a packet-switched network (NW). There are at least two PDP contexts (PDP1–PDP9) available in the packet-switched network (NW), which have at least partly different data transfer properties, whereby the PDP contexts (PDP1–PDP9) can provide at least partly different qualities of service for the transfer of information. In this method at least one application connection is established for at least one of said applications, for which application connection a quality of service is specified. In addition, this method is characterized in that at least one data flow is formed of the information to be transferred in the application connection, and one of the PDP contexts (PDP1–PDP9) is selected for each data flow of the application connection. The method is also characterized in that when the quality of service specified for the application connection changes, it is examined on the basis of the properties of the PDP contexts (PDP1–PDP9) available in the packet-switched network (NW) which of the PDP contexts (PDP1–PDP9) is suitable for use by the application connection with the changed quality of service, and the one of the PDP contexts (PDP1–PDP9), the data transfer properties of which are closest to the changed quality of service is selected for the application connection.

20 Claims, 7 Drawing Sheets

Figure 2A:
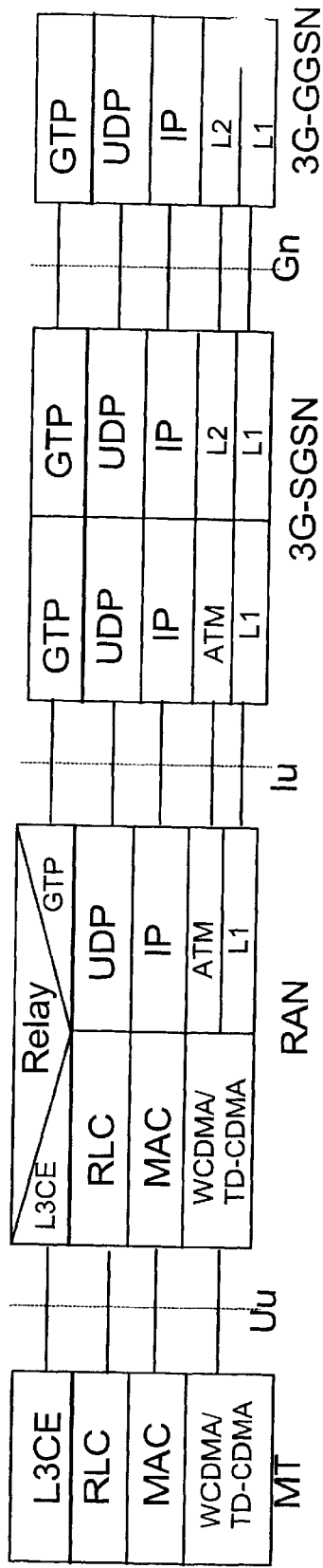

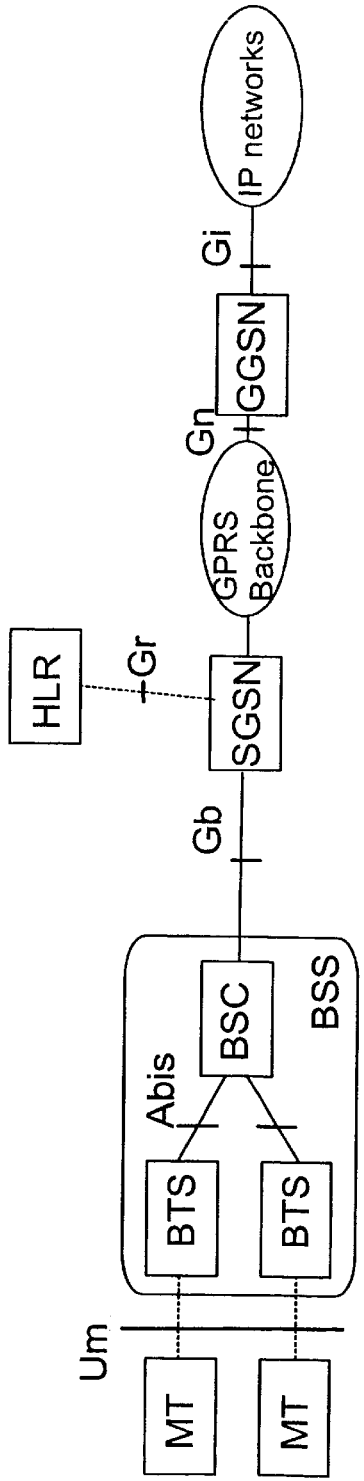
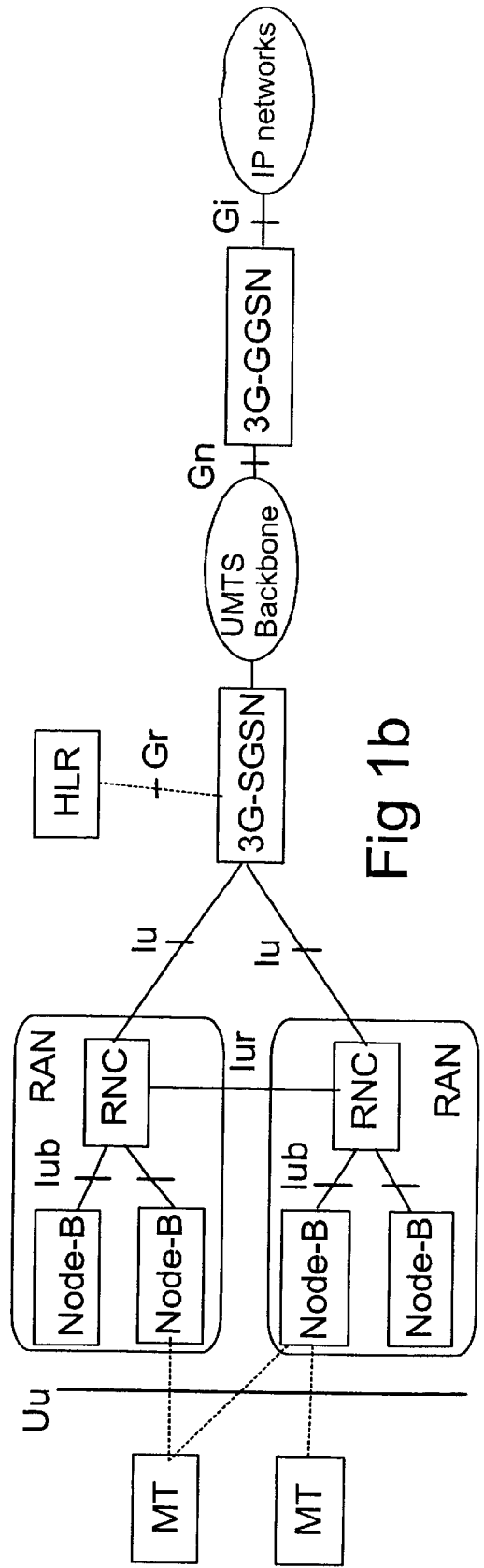
Fig 1a
Fig 1b

METHOD FOR OPTIMIZING DATA TRANSMISSION IN A PACKET SWITCHED WIRELESS DATA TRANSMISSION SYSTEM

The present invention relates to a method set forth in the preamble of claim 1 for optimising data transmission in a packet switched wireless data transmission system. The invention also relates to a wireless data transmission system as set forth in the preamble of claim 12, and a wireless data terminal as set forth in the preamble of claim 20 for use in a wireless data transmission system according to the invention.

In addition to the circuit switched connections, packet switched connections are being developed for wireless data transfer systems, such as GSM and UMTS. In a packet switched connection, it is not necessary to allocate resources to the connection for its entire duration, but only for the time when there is transferable information present in the connection. This information to be transferred is converted into one or several packets, which are transmitted in the data transfer system. FIG. 1a illustrates a packet switched data transmission system developed for the GSM system, the General Packet Radio Service (GPRS), which will be called the GPRS packet network in this specification. Correspondingly, FIG. 1b illustrates a packet switched data transmission system being developed for the UTMS (Universal Mobile Telecommunications System), which will be called the UMTS packet network in this specification.

The GPRS packet network consists of base station subsystems (BSS) of the GSM mobile communication network and a subscriber data base, such as a home location register (HLR). The base station subsystem BSS consists of base transceiver stations BTS and base station controllers BSC. In addition, the GPRS packet network includes serving GPRS support nodes (SGSN) and gateway GPRS support nodes (GGSN). The serving GPRS support nodes SGSN and the gateway GPRS support nodes GGSN are connected to a GPRS backbone network GBN for data transmission.

Interfaces between different units of the GPRS system are also shown in FIG. 1a. The radio interface Um is the interface between a wireless mobile terminal MT and a base transceiver station BTS of the base station subsystem BSS. In this radio interface Um, data transmission is carried out as radio frequency signals. The base transceiver station BTS and the base station controller BSC are interconnected by a BTS-BSC interface called Abis. The serving support nodes SGSN can communicate with other serving support nodes SGSN. Data transmission between a GPRS packet network and other networks takes place via an external connection interface Gi and gateway support nodes GGSN. The base station subsystem is connected to the serving support node SGSN via a BSS-SGSN interface Gb.

The UMTS packet network shown in FIG. 1b includes blocks which have similar functions as those of the GPRS packet network. A notable difference in the UMTS packet network is the structure of the base station subsystems. The base stations Node-B and the radio network controllers (RNC) which control them constitute a radio access network (RAN). Each base station Node-B is connected to one radio network controller RNC via a Node-B-RNC interface Iub. Correspondingly, the radio network controllers RNC are connected to the serving UMTS support node via a 3G-SGSN Iu interface. The radio network controllers RNC can be connected to other radio network controllers RNC via an Iur interface. An arrangement like this enables carrying out data transmission between a mobile terminal MT and the UMTS packet network via the radio interface Uu simultaneously via one or several base stations Node-B. In addition, the UMTS packet network includes gateway GPRS support nodes 3G-GGSN. The serving GPRS support nodes 3G-SGSN and the gateway GPRS support nodes 3G-GGSN are connected to an UMTS backbone network UBN for data transmission.

An essential difference between a GPRS packet network and an UMTS packet network is the fact that in the GPRS system, data transfer at the radio interface Um is based on time division multiple access (TDMA). In the UMTS system, data transfer at the radio interface Uu is based on code division multiple access (CDMA), such as wideband CDMA (WCDMA) or a combined time division and code division multiple access (TD-CDMA).

Figure 2B:
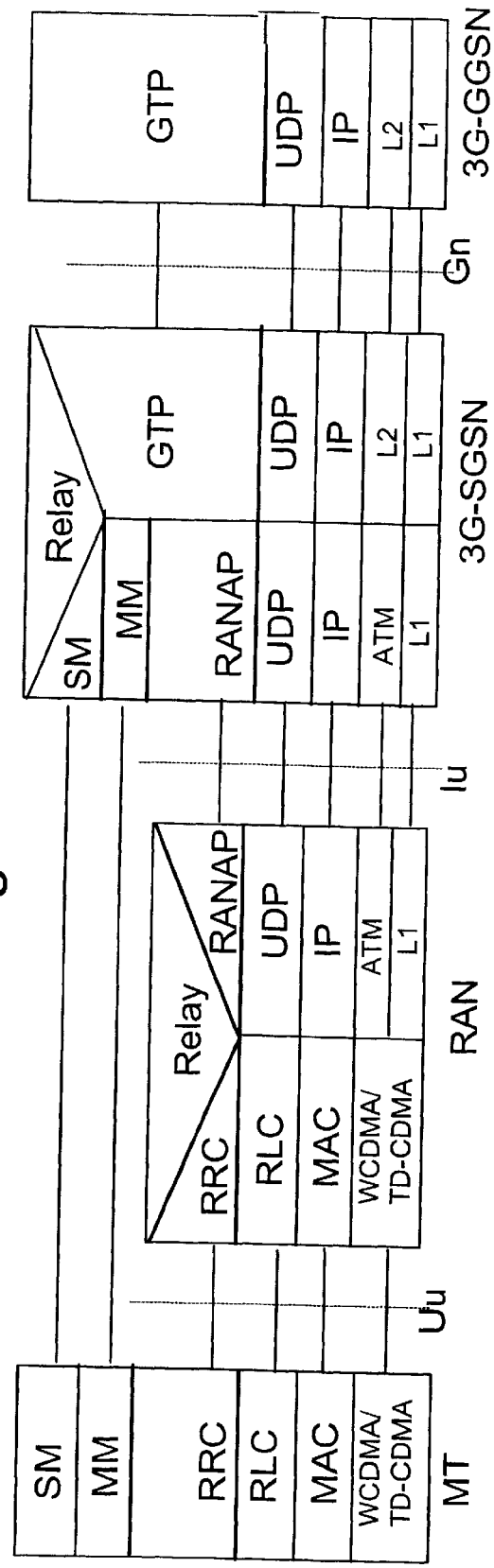

FIG. 2a illustrates data transfer on the user level in an UMTS packet network as a protocol stack description. Correspondingly, FIG. 2b illustrates data transfer on the control level in an UMTS packet network as a protocol stack description. Data transfer by means of a mobile terminal MT and a radio access network RAN is carried out in the physical layer as radio frequency signals. These signals can be, for instance, wideband CDMA signals or signals with combined time division and code division multiple access (TD-CDMA). Data transfer on the radio path is controlled with the operations of the MAC layer. Bursts for transmission to the radio path are formed In this MAC layer, and in reception, these bursts are correspondingly converted into packets of the upper layer. The layer above the MAC layer in this radio interface Uu is the RLC layer. The tasks of the RLC layer include segmentation of the SDU data packets of the upper level so as to make them suitable for the radio interface. In addition, the RLC layer transfers the SDU data packets of the user in such a manner that the parts of the packets that were segmented during reception can be restored to the right order. In addition, the operations of this RLC layer can be used to support different qualities of service (QoS), for instance so that the mode of operation and the number of retransmissions are selected in this RLC layer. With regard to the packet switched connection, the RLC layer can operate either in an unacknowledged mode, whereby no retransmission is carried out for defective packets, or in an acknowledged mode, whereby retransmission of the packets is performed if required, when an error has occurred.

In the protocol stack of the control level, the layer above the MAC layer is the RRC layer, the tasks of which include radio resource control. The above mentioned layers RRC, RLC, MAC and the physical layer have been implemented both in the mobile terminal MT and the radio network RAN to be used in data transfer at the radio interface Uu.

Data transfer in an UMTS packet network between a radio access network RAN, a serving support node 3G-SGSN and a gateway support node 3G-GGSN can also be divided into similar layer structures, of which a preferred example is shown in the FIGS. 2a and 2b. However, the placement of different layers in these protocol stacks need not be the same as in the FIGS. 2a, 2b, but it can vary in practical applications. For instance, conversions from the protocols of the radio interface Um, Uu (L3CE, RLC, MAC, . . . ) to the protocols of the GPRS backbone network (GTP, UDP, IP, . . . ) can be carried out in the serving support node 3G-SGSN instead of the radio access network RAN. The operations of these layers will not be described in more detail in this connection, because in wireless data transfer the most important interface that has an effect-on the quality of service is typically the radio interface Um, Uu.

The mobility management of a mobile terminal MT is controlled by the operations of the MM (Mobility Management) layer of the protocol stack. This MM layer is implemented in the mobile terminal MT and the serving GPRS support node 3G-SGSN. Correspondingly, the session management operations are carried out in the SM (Session Management) layer, which is also implemented in the protocol stacks of the mobile terminal MT and the serving GPRS support node 3G-SGSN.

In the user level protocol stack there is, above the RLC layer, an L3CE layer, which is implemented in the mobile terminal MT and preferably in the radio access network RAN. This L3CE (Layer-3 Compatibility Entity) corresponds to the SNDCP protocol of the GPRS system. The L3CE layer is used to control the operation of the radio interface Uu. The L3CE protocol is a so-called compatibility protocol for the network layer, and one of its purposes is to enable the operation of the system in connection with different services and network layer protocols. This L3CE layer can support many network layer protocols. These supported network layer protocols include, for instance, the Internet protocols 4 (IPv4) and 6 (IPv6), but the use of other network layer protocols can also be enabled by making changes mainly in the L3CE layer (Layer-3 Compatibility Entity). In this case, adding a new network layer protocol does not require making changes in the lower level protocols. The L3CE layer also provides operations by which the reliability of the information to be transferred and the efficiency of the use of the channel can be improved. This can be implemented by various methods of optimisation, such as compressing the header fields and/or data fields of the packets.

In the following description, mainly the UMTS packet network will be used as an example of a packet network, but naturally the invention can also be applied to other packet networks, in which it is possible to select different qualities of service for the packet switched connection.

Some terms used in connection with the description of the method and the operation of the data transfer system according to the invention will be defined in the following. Firstly, the DP context relates to the data transfer connection (packet switched connection) established for the transmission of the data packets of one or several applications. The PDP context has mainly two tasks: Firstly, it is used for reserving a PDP address, such as an IPv4 connection address, for a user, and secondly, for establishing a logical connection in a packet switched network with a certain quality of service (QoS). A packet switched network may provide many such PDP contexts, in which at least some of the parameters are different. In addition, a default PDP context can be defined in a packet switched network. The set of quality of service parameters defined for each PDP context is called a quality of service profile (QoSP, QoS Profile). One or several applications can use a certain PDP context, whereby the quality of service is the same for each application using the same PDP context. Secondly, the application connection is connected to a logical connection formed for one application preferably between a mobile terminal and a gateway GPRS support node of a packet network with a certain quality of service. The application connection can comprise one or several data flows.

In order to initiate an application connection, a connection is created at first. When creating a connection, a suitable PDP context is selected for the application connection on the basis of the quality of service wanted and the PDP address. The quality of service parameters of the new application connection are taken into account in the selected PDP context, and the quality of service profile of the PDP context is modified if required. If there is no suitable PDP context, it is possible to activate one according to the parameters of the application connection and thus create a new packet switched connection. If the application connection does not specify any quality of service parameters, the default PDP context is selected. An UMTS packet network can contain several packet switched connections, or PDP contexts, for one PDP address. On the other hand, in the phase 1 realisation of the GPRS packet network there can be only one packet switched connection for each PDP address. In the packet network discussed in this specification, this type of a connection forms a logical link with a certain quality of service between two terminal points. These two terminal points are preferably a mobile terminal MT and a gateway GPRS support node 3G-GGSN.

If there are several packet switched connections available for one PDP address, these different packet switched connections can also have different quality of service profiles. For saving information, a PDP context comprises a database or the like, containing information, which has been saved for each packet switched connection and which is needed when a packet switched connection is established, such as the type of connection (e.g. IPv4), PDP address (e.g. IPv4 address), the requested quality of service profile including the quality of service parameters requested by the user, and the quality of service profile including the quality of service parameters given by the packet network. If the packet network includes a default PDP context, it is selected preferably in a situation where none of the other PDP contexts available is suitable for the requested application connection.

The term data flow is used to denote data transfer of packets which have the same source and target. For instance, in the Internet data network, packets using the IP protocol, which have the same source and target address and the same source and target gate number, constitute one data flow. Data flows are unidirectional, and each application having a data transfer connection from a mobile terminal to a packet network has at least one data flow. An example of these applications is a web browser, by means of which the user of a mobile terminal (MT) can browse, for instance, the home pages of service providers having a data transfer connection to the Internet. When a web browser is used, the target address and the gate number can change very quickly, whereby there can be many data flows simultaneously. In order to identify different data flows, it is not necessary to use the above mentioned source and target address and the source and target gate number, but the identification can also be carried out in other ways, as known as such in the art. In this specification, this identification information is referred to by the common name data flow identifier, which can thus be constructed in many different ways.

A bearer is basically a logical data transfer channel between two terminal points of a packet network. This bearer has certain properties, such as a certain quality of service (QoS). There are many different types of bearers in an UMTS packet network, such as an UMTS Bearer and a Radio Access Bearer. The UMTS bearer provides a logical data transfer channel between a mobile terminal MT and a gateway GPRS support node 3G-GGSN. UMTS bearers can be connected to certain PDP contexts, because a PDP context provides a certain quality of service between these terminal points (MT, 3G-GGSN).

In order to provide data transfer services for applications which require different data transfer properties, UMTS bearers with different data transfer properties have been specified in the UMTS packet network. At the time of filing this application, the UMTS bearers are divided into four different traffic classes, namely TC1–TC4 (Conversational, Streaming, Interactive, Background). Some preferred examples of the parameters of these classes are shown in Table 1. The differences between these traffic classes include, for instance, the length of delay allowed in them. For example, the first traffic class TC1 (Conversational) is intended for applications in which long delays in data transfer are not allowed. As a contrast to this, the fourth traffic class TC4 (Background) is intended for applications in which delays in data transfer can be tolerated. Other properties specified for different traffic classes include bit error rate (BER), maximum bit rate and service precedence. Naturally, the invention can also be applied to other systems, and the number of traffic classes need not be four. In addition, in practical applications the properties of the traffic classes can differ from those presented here.

erties of this other PDP context correspond better to the new properties wanted for the connection. The method according to the present invention is characterised in what is set forth in the characterising part of claim 1. The data transfer system according to the present invention is characterised in what is set forth in the characterising part of claim 12. The mobile terminal according to the present invention is characterised in what is set forth in the characterising part of claim 20.

The present invention provides considerable advantages as compared to the prior art solutions. When the method of the invention is used, the properties of a connection can be changed so that other simultaneously active connections and their properties are not substantially affected. When the method according to the invention is used, the data transfer system can also be used more efficiently, because the prop-

TABLE 1

| Traffic class | First class real time, e.g. a telephone conversation guaranteed capacity no acknowledgement | Second class real time, e.g. video information guaranteed capacity acknowledgement possible buffering on the application level | Third class interactive best effort method acknowledgement web browser, Telnet real time control channel | Fourth class background transmission with the best effort method acknowledgement background transmission of e-mail messages, calendar events etc. |
|---|---|---|---|---|
| Delay | 100 ms, 200 ms, 400 ms | <1 s | 2 s | N/A |
| Bit error ratio | $10^{-3}, 10^{-4}, 10^{-5}$ | $10^{-5}, 10^{-6}, 10^{-7}, 10^{-8}$ | $<10^{-9}$ | $<10^{-9}$ |
| Max. bit rate | 0–2 Mbit/s | 0–2 Mbit/s | N/A | N/A |
| Service precedence | High, medium, low | High, medium, low | High, medium, low | High, medium, low |

One problem associated with, for instance, packet networks according to phase 1 of the GPRS packet networks is the fact that the quality of service specified when the application connection is established cannot be changed without disconnecting the application connection or without affecting the quality of service of other application connections using the same PDP context simultaneously. However, the quality of service needed by an application can vary during the use of the application. The user can, for instance, by means of a Telnet application, use a mobile terminal as a remote terminal for communicating with a computer. Thus the user can transfer information from the computer, such as program files, to the terminal device. Data transfer must then be as error free as possible, but the rate of data transfer is not an important criterion. However, when a Telnet application is used for viewing text files saved in the computer, data transfer rate should be increased, even if the probability of errors would also increase. The home pages viewed with a web browser can be very different. Some home pages contain a lot of graphic information, the transmission of which from the server of the service provider to the mobile terminal of the user requires heavy use of resources, if the transmission time is to remain relatively short. On the other hand, when text information is transmitted, the amount of information transmitted at a time is typically much smaller than the amount of information contained in the graphics. Some home pages also contain video or audio information, in which case real time data transmission is an important consideration.

It is an object of the present invention to provide a method for changing the properties of the connection, such as the quality of service, while the connection is active. The invention is based on the idea that when the properties of the connection are changed, the PDP context being used for the connection is changed to another PDP context, if the properties of active connections can be changed during the connection. If, for instance, a slower data transfer rate is selected during the connection, more data transfer resources become available for other simultaneous connections.

Figure 3A:
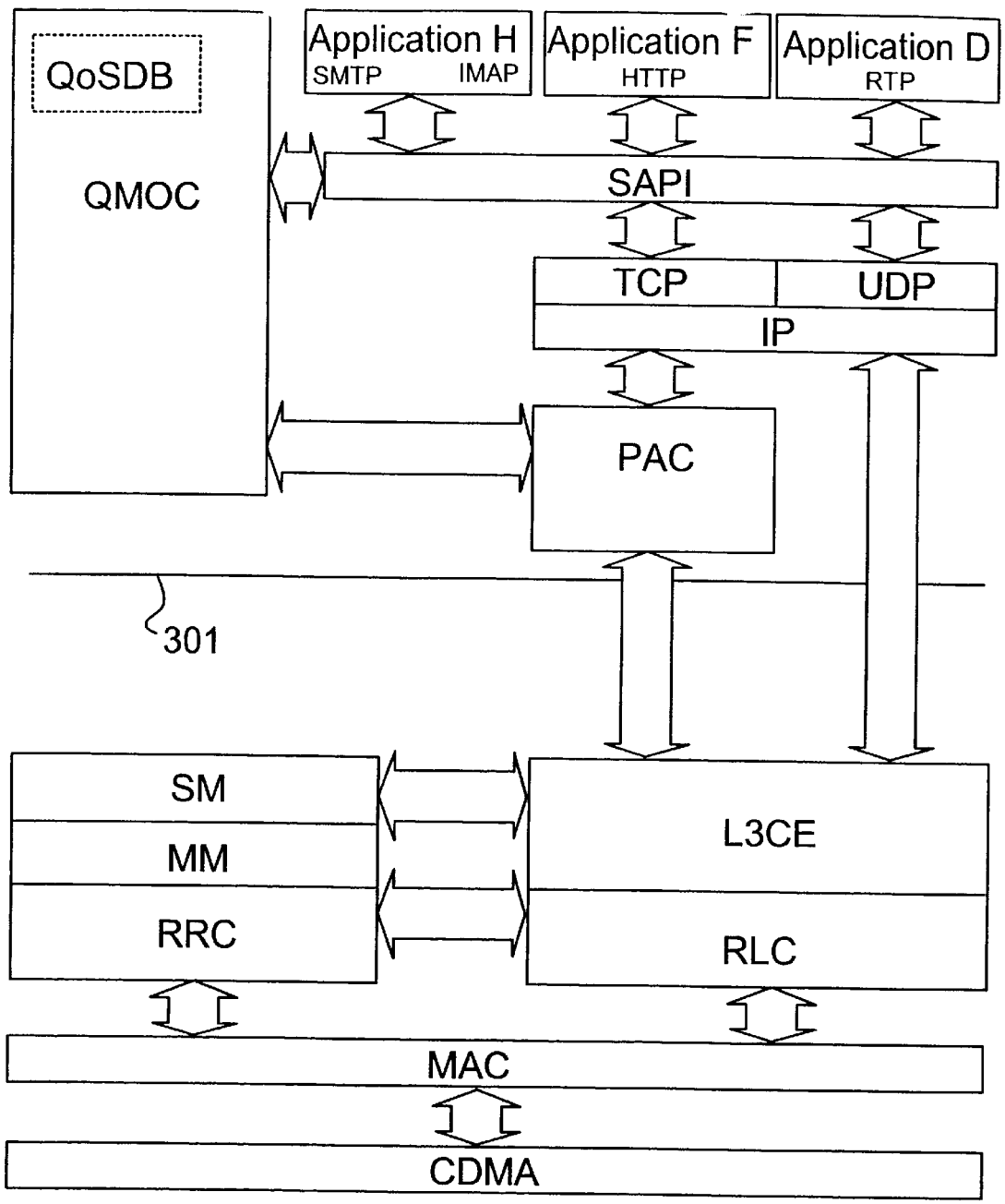
Figure 3B:
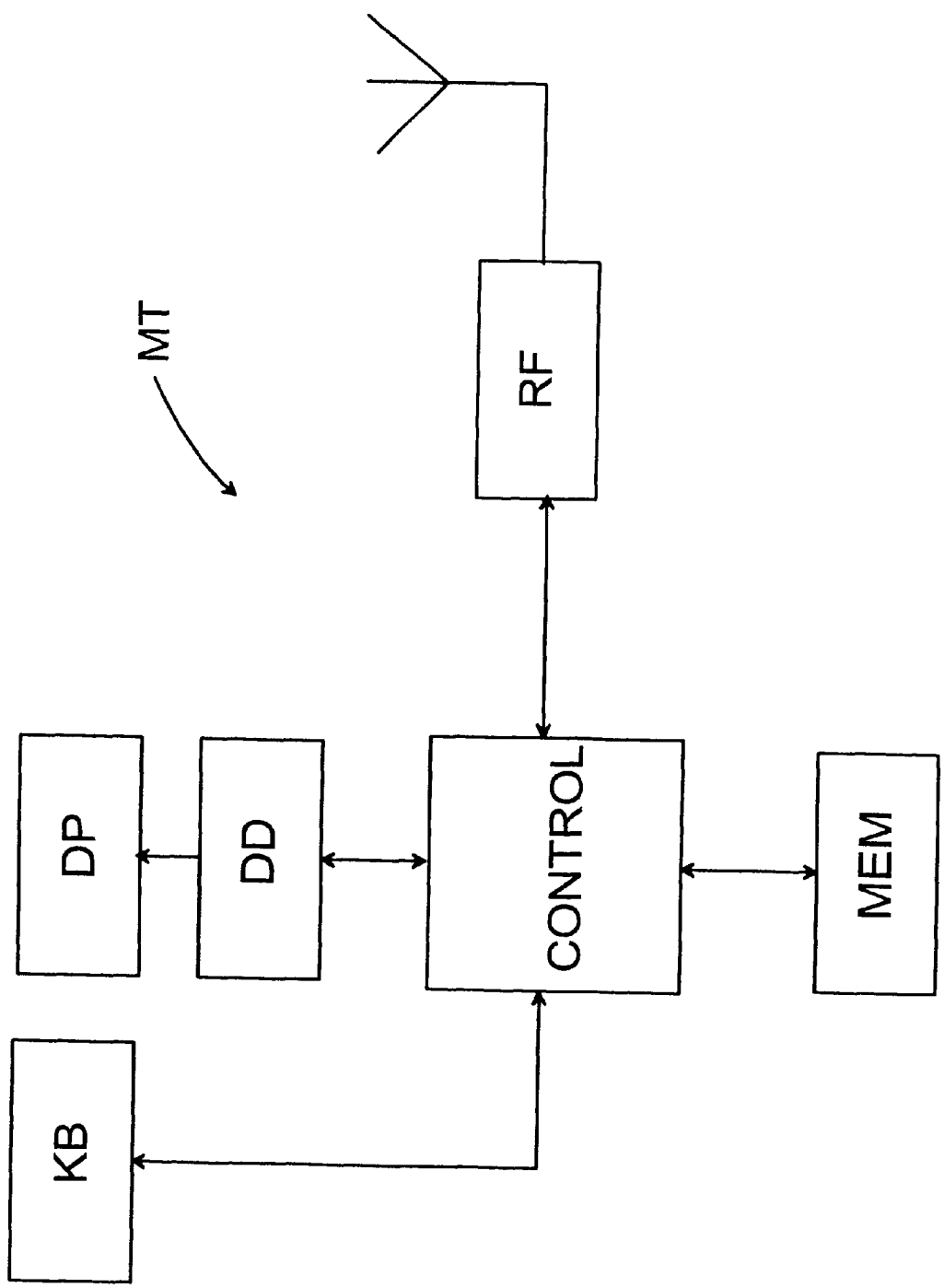
Figure 4A:
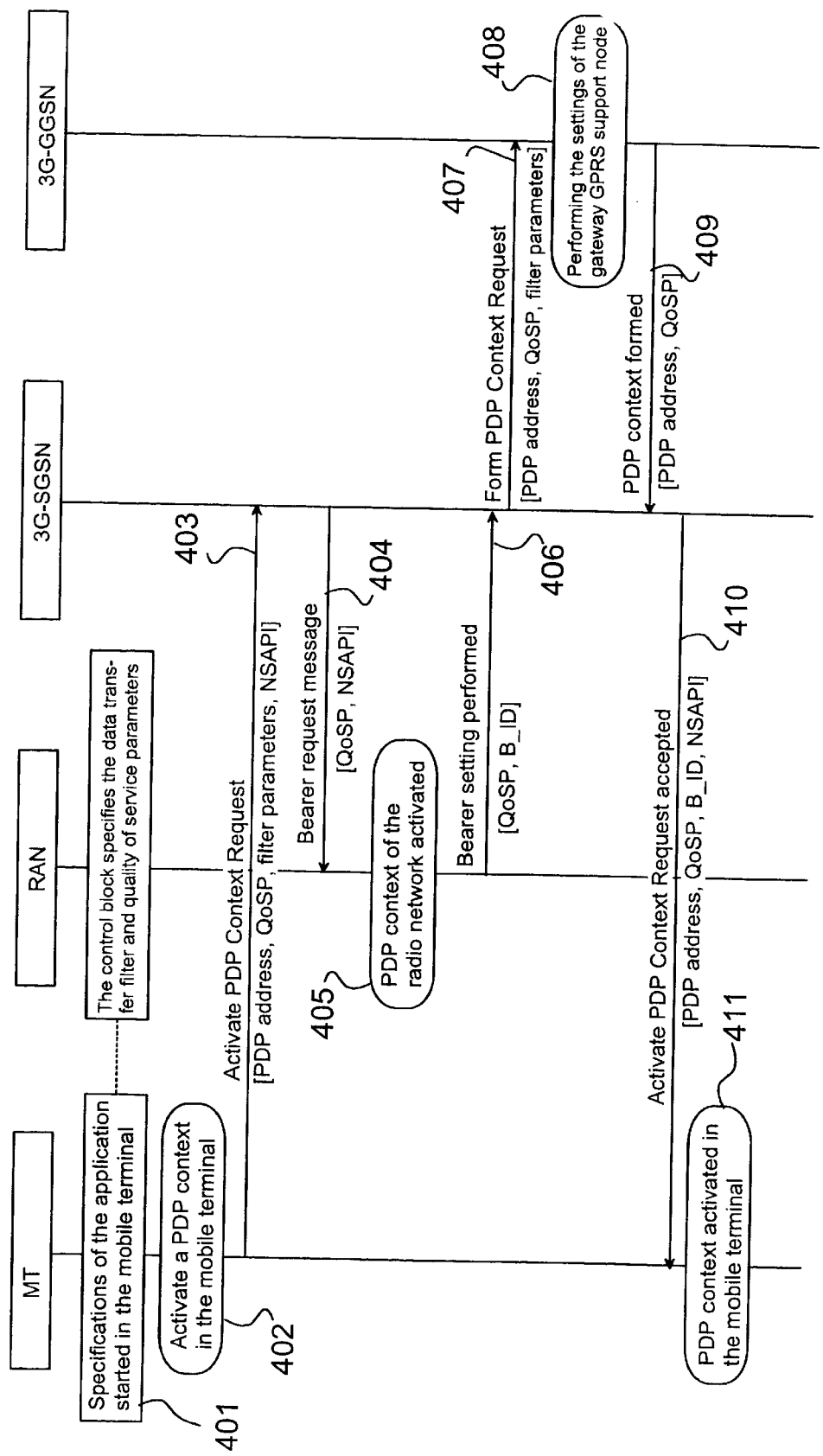
Figure 4B:
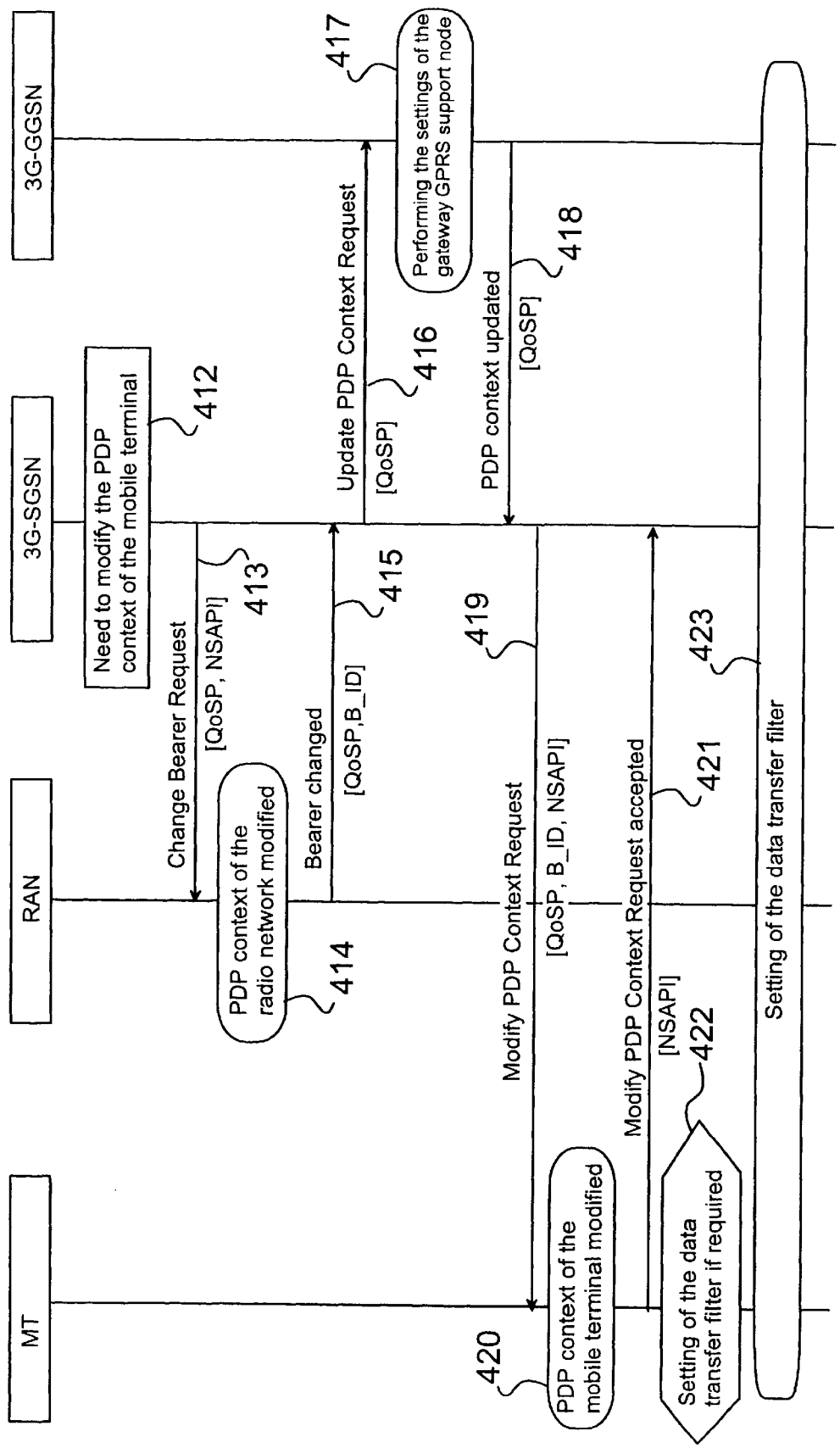
Figure 5:
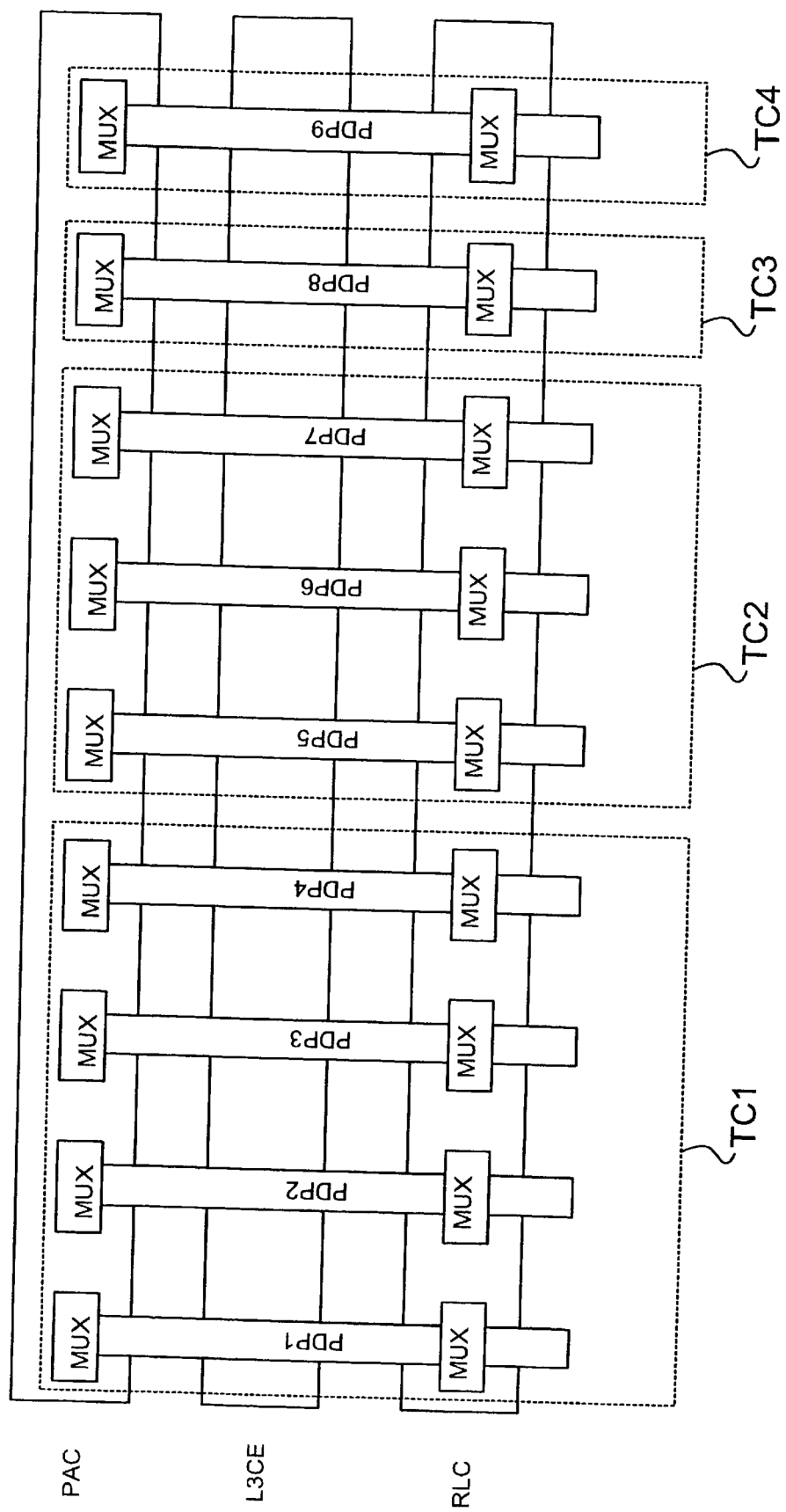

In the following, the present invention will be described in more detail with reference to the accompanying drawings, in which FIG. 1a shows a GPRS data transfer system, FIG. 1b shows a UMTS data transfer system, FIG. 2a illustrates data transfer on the user level in a UMTS data transfer system as a protocol stack description, FIG. 2b illustrates data transfer on the control level in a UMTS data transfer system as a protocol stack description, FIG. 3a illustrates the operation of a mobile terminal according to a preferred embodiment of the invention as a protocol stack description, FIG. 3b shows a mobile terminal according to a preferred embodiment of the invention as a simplified block diagram, FIG. 4a is a simplified signalling diagram of the activation of the PDP context in a method according to a preferred embodiment of the invention, FIG. 4b is a simplified signalling diagram of the changing of the PDP context as initiated by the packet network in a method according to a preferred embodiment of the invention, and FIG. 5 illustrates a method according to a preferred embodiment of the invention for selecting and changing the PDP context in a mobile terminal according to a preferred embodiment of the invention.

FIG. 3a illustrates the operation of a mobile terminal MT according to a preferred embodiment of the invention in connection with a method according to the invention. Some layers of the protocol stack and operational blocks are shown in the figure. All possible protocols and operational units are not shown in FIG. 3a; only those which are important for the description of the invention are included. The protocols can be divided into two main types: internal protocols of the packet network, and external protocols. The internal protocols of the packet network include, for instance, L3CE and SM. Examples of external protocols that may be mentioned in this context are TCP and IP.

In FIG. 3a, a horizontal line 301 has been used to make a distinction between two parts of the system, which are different with regard to the operation of the mobile terminal MT. The items shown below the line are mainly the internal protocols of the packet network. The items shown above the line 301 are the essential features of this invention, and examples of some external protocols and applications. Examples of the applications are e-mail, such as SMTP (Simple Mail Transfer Protocol) or IMAP (Internet Message Access Protocol); a web browser using, for instance, the HTTP protocol (Hyper Text Transfer Protocol); and a real-time data transfer application, such as streaming of video programs, in which the RTP protocol (Real Time Protocol), for instance, is used. The applications are connected to an interface called SAPI (Socket Application Programming Interface). The socket application programming interface SAPI has a data transfer connection with the network layer protocol (NLP) block. The Socket Application Programming Interface SAPI performs the conversion of information coming from applications, which is to be sent to the packet network, into the protocol form used in the transmission layer, such as TCP (Transmission Control Protocol) or UDP (User Datagram Protocol). In the network layer NLP, these protocol packets of the transmission layer are converted into packets of the network layer protocol. One well-known network layer protocol used especially in the Internet is IP (Internet Protocol). The network layer packets are transferred to the packet classifier (PAC), which maps packets of different data flows to the right data transfer queue (PDP context). The operation of the packet classifier PAC will be described in more detail later in this specification.

FIG. 3a also shows the control block QMOC (QoS Management & Optimisation Control). The tasks of this control block QMOC include controlling the activation of application connections and data flows of each application and the allocation of the resources required. In addition, the control block QMOC performs the changes required by the altered needs of the quality of service.

FIG. 3b shows a mobile terminal MT according to a preferred embodiment of the invention as a simplified block diagram. Some operational blocks that are important for the description of the invention are shown in the figure. A mobile terminal MT includes a processor block CONTROL, which can be implemented by one or several processors, such as a microprocessor, a digital signal processing unit, etc., as known as such in the art. This processor block can also be implemented as a part of an Application Specific Integrated Circuit (ASIC), in which other operations of a mobile terminal can also be carried out. For saving information, the mobile terminal MT includes a memory, such as read memory, read/write memory and/or non-volatile reprogrammable memory. The radio part RF comprises means required for carrying our radio data transfer to the base station Node-B. In addition, a mobile terminal MT preferably includes a keyboard KB, a display DP and a display driver DD. In practice, a mobile terminal MT can be implemented in many different ways. A mobile terminal MT can be formed as one complete entity, such as the Nokia 9100 Communicator, or it can comprise a separate data transfer device, such as a mobile station, and a data processing device, such as a portable computer, whereby a local data transfer connection is arranged between these units.

In the following, a method according to a preferred embodiment of the invention will be described in more detail with reference to the protocol stack description in FIG. 3a and the block diagram in FIG. 3b. The mobile terminal MT has a data transfer connection with the packet network NW. In order to use the services of the packet network, the mobile terminal MT performs at first an attach request, by which it notifies that it is ready for the transmission of packet data. While the mobile terminal MT is attaching to the network, the support node performs the mobility management (MM) operation and user authentication. During the attachment the packet network, preferably its serving support node 3G-SGSN, can check from the subscriber information HLR (Home Location Register) if there are any limits set for the user in packet-switched connections, such as preventing the use of some traffic classes. Information like this can also be saved in the subscriber identity module (SIM) of the mobile terminal, or the like.

In order to send and receive information, the packet data protocol (PDP) is activated. In the first activation, the default PDP context is preferably selected for each PDP address. The activation forms a logical link between the mobile terminal MT and the gateway GPRS support node 3G-GGSN. FIG. 4a illustrates the activation of the packet data protocol as a simplified signalling diagram. When the packet data protocol is activated, a packet data address used in a packet-switched connection, such as an IP address, is specified for the mobile terminal MT, whereby the address of the mobile terminal MT is known in the gateway GPRS support node 3G-GGSN. When the packet data protocol is activated, a packet-switched connection for data transfer is established with the mobile terminal MT, the support node and the gateway GPRS support node, and a protocol (X.25 or IP), PDP address (e.g.

X.121 address), quality of service and network service access point identifier (NSAPI) are specified for the packet-switched connection.

In a packet network, in which the present invention can be applied, it is thus possible to use many different PDP contexts for one PDP address. When this is the case, the packets of the application connection cannot be connected to a certain PDP context on the basis of the PDP address. In order to enable this connecting, a so-called data transfer filter has been developed. With a data transfer filter, data flows of a certain type can be connected to a certain PDP context, whereby packets to be transferred in different application connections can be directed to the right PDP context. The data transfer filter contains information e.g. about the data flows, the transmission of which is controlled with the data transfer filter. Because the data flows are unidirectional, both the mobile terminal MT and the packet-switched network have separate data transfer filters. The operation of these data transfer filters will be described in more detail later in this specification.

When, for instance, a user starts an application in a mobile terminal MT, which application needs the data transfer services of the packet network, the socket application programming interface SAPI transmits information of this to the control block QMOC. This request for an application connection can contain information about the quality of service QoS requested by the application. If that is the case, the control block QMOC can use this quality of service information in the establishment of an application connection. If this information about the quality of service is not transmitted from the application, the control block QMOC can check from a data base QoSDB (FIG. 3a) formed in the mobile terminal MT, preferably in the memory means MEM (FIG. 3b), whether information about the quality of service of the application has been saved there. If that is the case, the control block QMOC can use this information saved in the database QoSDB in the establishment of an application connection. If information about the quality of service of the application is not found, the application connection is preferably established by using the default PDP context.

The control block QMOC can also receive quality of service information from the equipment, such as the keyboard KB or the display driver DD of the mobile terminal.

The quality of service parameters of the application are not necessarily identical with the quality of service parameters of the packet-switched network. In that case, the control block QMOC performs the conversion from the quality of service parameters of the application into the quality of service parameters of the packet-switched network (block 401 in FIG. 4a). For example, a bit error ratio of 10e-3 has been specified for the application, but in the packet-switched network the closest suitable bit error ratio is, for instance, 10e-4.

In a preferred embodiment of the invention, the user can define settings that control the operation of the control block QMOC. On the basis of these settings it is possible to select, for instance, whether the quality of service information transmitted by the socket application programming interface SAPI and/or the quality of service information saved in the database QoSDB is used when establishing the application connection. In addition, an advantageous feature is the fact that the user can set the data transfer parameters of the application program, whereby the control block QMOC can use these parameters when specifying the quality of service requested for the application.

Another task to be performed in the activation of the PDP context is specifying a data transfer filter for the data flow(s) of the application. The data transfer filters are preferably specified so that there is one data transfer filter for each application connection which does not use the default PDP context. Then the data transfer filter contains information for identifying the packets, such as a source/target address and a source/target gate, or other unique identifier. In addition, the data transfer filter comprises information about which PDP context the data flow is using, information about the quality of service allocated to the application connection, and possibly also other information related to the data flow. Preferably the data transfer filters are formed such that one data transfer filter covers as many data flows as possible, and one data flow is specified in only one data transfer filter. In an ideal situation, one data transfer filter corresponds to one application and one application connection.

In order to allocate resources to the application, the mobile terminal MT and the packet network initiate a packet-switched connection (block 402). This is done so, for instance, that a mobile terminal MT sends a request message (arrow 403) to the serving GPRS support node 3G-SGSN for activating the PDP context, which message includes as parameters e.g. the quality of service profile (QoSP) requested for the packet-switched connection, address, information about a possible data transfer filter (filter parameters), and the network service access point identifier (NSAPI). The serving GPRS support node 3G-SGSN sends a request message to the radio network RAN for reserving a radio access bearer RAB for the PDP context from the packet-switched network (arrow 404). This radio access bearer RAB is selected such that the desired quality of service can be met as well as possible. The radio network RAN activates the selected radio access bearer, if it was not active (block 405). After this, the radio network RAN sends an acknowledgement message (arrow 406) to the serving GPRS support node 3G-SGSN, transmitting information about the quality of service that can be achieved with the selected radio access bearer (negotiated quality of service) and the bearer ID (B_ID).

The serving GPRS support node 3G-SGSN sends a message for initiating a packet-switched connection to the gateway GPRS support node 3G-GGSN (arrow 407). The message sent for initiating a packet-switched connection preferably includes the PDP address, the quality of service profile and possible data transfer filter parameters. The measures required for initiating a packet-switched connection are carried out in the gateway GPRS support node 3G-GGSN (block 408). At this stage, the gateway GPRS support node 3G-GGSN can examine how loaded the packet-switched network is, for finding out whether the requested quality of service can be guaranteed for the application, or if that is not possible, whether to restrict the quality of service given to the application, or not to initiate the packet-switched connection at all. If the packet-switched connection can be initiated, the gateway GPRS support node 3G-GGSN sends a notification of the quality of service given to the packet-switched connection in a reply message to the serving GPRS support node 3G-SGSN (arrow 409). The gateway GPRS support node 3G-GGSN can allocate a dynamic PDP address to the user when required.

The serving GPRS support node 3G-SGSN sends a reply message to the mobile terminal MT (arrow 410) containing information (e.g. PDP address) about which packet-switched connection the reply message relates to, the negotiated quality of service, the bearer ID and the network service access point identifier (NSAPI). After this, information about the packet-switched connection initiated is transmitted to the compatibility protocol block L3CE (Layer-3 Compatibility Entity) and preferably also to the control block QMOC (block 411) in the mobile terminal MT.

This is conveniently arranged so that a buffer is formed in the mobile terminal MT for each data flow and application connection for temporary saving of the information to be transmitted. This buffer can be, for instance, a memory area reserved from the memory means MEM. In addition to this, a transmission and reception buffer is preferably formed for each PDP context for temporary saving of data flow packets using the PDP context. The need for these buffers and the practical implementation thereof is a technique known as such to a person skilled in the art, and therefore they are not described in more detail in this specification.

The selection and changing of the PDP context in a mobile terminal MT according to a preferred embodiment of the invention will now be described by means of a few examples and with reference to FIG. 5. In FIG. 5, the letters A to H are used to denote examples of applications, which are:

application A: video conference (first traffic class, bit error ratio BER 10e-4, delay class 1, bit rate 50 kbit/s)

application B: transmission of audio signal (first traffic class, BER 10e-4, delay class 1, bit rate 25 kbit/s)

application C: transmission of audio signal of a multimedia application (first traffic class, BER 10e-4, delay class 1, bit rate 25 kbit/s)

application D: transmission of video signals of a multimedia application (first traffic class, BER 10e-4, delay class 2, bit rate 25 kbit/s)

application E: transmission of data signals of a multimedia application (second traffic class, BER 10e-5, delay class 1, bit rate 15 kbit/s)

application F: web browser (third traffic class, BER 10e-9, delay class 1, bit rate best effort method)

application G: Telnet (third traffic class, BER 10e-9, delay class 1, bit rate best effort method)

application H: E-mail (fourth traffic class, BER 10e-9, delay class 1, bit rate best effort method)

FIG. 5 also shows the different PDP contexts which can be used in a packet-switched network according to this example. These different PDP contexts are denoted with the references PDP1–PDP9. In addition, a broken line is used in the figure to show the traffic class TC1–TC4 associated with each PDP context PDP1–PDP9. For instance, the first traffic class TC1 comprises the first PDP1, the second PDP2, the third PDP3 and the fourth PDP context PDP4, the second traffic class TC2 comprises the fifth PDP5, the sixth PDP6 and the seventh PDP context PDP7, the third traffic class TC3 comprises the eighth PDP context PDP8, and the fourth traffic class TC4 comprises the ninth PDP context PDP9. The blocks PAC, L3CE, RLC illustrate the different layers of the protocol stack in the mobile terminal MT. The direction of the data flows in the illustration of FIG. 5 is downwards, when information is sent from the mobile terminal MT to the packet network NW, and upwards, when packets are received from the packet network NW to the mobile terminal MT. The required protocol changes are carried out in the different blocks of the protocol stack, in the manner known as such in the art.

When starting a web browser, for instance, (application F), the socket application programming interface (SAPI) transmits information about starting this application to the control block QMOC. Here it is assumed that the socket application programming interface does not transmit the quality of service information, and quality of service information about this application has not been saved in the control block QMOC, either. Thus the control block QMOC cannot determine the quality of service, and the control block QMOC selects the default PDP context for this application. In that case, data transfer filters are not specified for this application, either.

In connection with the starting of the Telnet application (application G), the control block QMOC detects that quality of service information has been saved for this application. This saved quality of service information QoS shows that the third traffic class has been specified for this application. The control block QMOC examines which PDP context is available for this third traffic class. The example discussed here comprises only one PDP context, the eigth PDP context PDP8, which is available in the third traffic class. This eigth PDP context is also the default PDP context in the system of this example. Thus the default PDP context is selected as the PDP context, whereby no data transfer filters are specified for this application.

When the E-mail application (application H) is started, the socket application programming interface does not transmit quality of service information, but for this application, quality of service information has been saved in the internal database. From this information, the control block QMOC detects that the fourth traffic class has been specified for this application. The PDP context corresponding to the fourth traffic class is the ninth PDP context PDP9, and thus the control block QMOC selects this PDP context for use by this application H. In addition, the control block QMOC specifies a data transfer filter for the application. This data transfer filter is, for instance, a database in which information such as the identifier used in the data flow packets, the PDP context, quality of service parameters or other information is saved. After this, the control block QMOC activates the selected PDP context PDP9 and sends the data from the data transfer filter to the packet classifier block PAC of the mobile terminal MT and the packet-switched network, preferably to the gateway GPRS support node 3G-GGSN, which is the second end of the data transfer connection. FIG. 4a is a signalling diagram showing an example of how the data transfer filter information can be transmitted in a packet-switched network between a mobile terminal MT and a gateway GPRS support node 3G-GGSN.

When a video conference application (application A) is started, the control block QMOC selects the PDP context, as was described above. On the basis of the quality of service parameters specified for the application, the control block QMOC selects another PDP context PDP2. In addition, a data transfer filter is specified for the application, the PDP context PDP2 is activated and the data transfer filter data are transmitted to the packet classifier block PAC of the mobile terminal MT and the gateway GPRS support node 3G-GGSN.

When an audio application (application B) is started, the corresponding selection of the PDP context is carried out, as was described above. The second PDP context PDP2 is selected as the PDP context in this case, too, as shown in the example of FIG. 5, and the data transfer filter parameters are specified for the data flow of this application. Because this second PDP context PDP2 has already been activated, the next step is to update the PDP context for the new situation and to transmit the data transfer filter data in the messages sent for modifying the PDP context. When the PDP context is updated, the bit rate of the PDP context is changed so that the required bit rate is the sum of the bit rates allocated to the application connections of applications using the same PDP context. Thus the quality of service of other applications using the same PDP context is not substantially influenced. Other parameters regulating the operation of the PDP context are preferably left unchanged, because changes in them might have an effect on the quality of service received by other applications using the same PDP context.

Applications C, D and E are the different signal components of a multimedia application. In this example, application C is the voice component of a multimedia application, application D is the video component and application E is the data component. Measures corresponding to those carried out for the above mentioned other applications are preferably carried out for each of these components. In this example, the second PDP context PDP2 is selected as the PDP context of the voice component C, whereby the PDP context is updated. The fourth PDP context PDP4 is selected as the PDP context of the video component D, and the PDP context is activated. The sixth PDP context PDP6 is selected for the data component E, and this PDP context is activated.

It is obvious that all the applications A to H are not necessarily run simultaneously and in the order presented here, whereby the measures in the activation and modification of the PDP contexts differ from those presented above, but a person skilled in the art will be able to perform them on the basis of this description.

When an application connection has been established, data transfer can be started. Then the information sent from the application of a mobile terminal MT is transferred to the socket application programming interface (SAPI), where the information is converted into packets according to the data link layer protocol. These packets are transmitted to the packet classifier PAC. When the packet classifier PAC receives each packet, it compares the IDentification (ID) information of the data transfer filters, such as address information, to the ID information contained by the packet. If the ID information of a data transfer filter matches the ID information of the packet, the packet classifier PAC finds out from the data transfer filter which PDP context has been selected for the data flow. If a data transfer filter is not found, the packet classifier PAC selects the default PDP context. After this, the packet classifier PAC transfers the packet to the compatibility protocol block L3CE (Layer-3 Compatibility Entity), as shown in FIG. 3a. If necessary, protocol conversions from the data link layer protocol to the form of the compatibility protocol block L3CE of the network layer are also carried out.

If compression of the network layer packets and other measures for optimising data transfer are needed, they are carried out in the network layer compatibility protocol block L3CE.

The packets sent from the mobile terminal MT as radio frequency signals are received at the base station Node-B and transferred to the serving support node. In the packet-switched network, the packets are transmitted from the serving GPRS support node 3G-SGSN to the gateway GPRS support node 3G-GGSN using the data transfer mechanisms (protocol stacks etc.) of the packet-switched network. For the application of the method, it is not important in which parts of the packet-switched network each block of the protocol stack is located. From the gateway GPRS support node 3G-GGSN the packets are transmitted to the receiver, who can be either in the same wireless packet-switched network, a different wireless packet-switched network or other packet-switched network, such as the Internet data network. The gateway GPRS support node 3G-GGSN will then carry out the necessary conversions between different protocols.

When packets are received to a mobile terminal MT, measures that are reverse to the corresponding transmission measures are carried out, whereby the operation of the method substantially corresponds to that described above.

With reference to the applications shown in FIG. 5 by way of example, the changing of the quality of service using a method according to a preferred embodiment of the invention will be described in the following. The need to change the quality of service can originate from the user of the mobile terminal MT, the application and/or the packet-switched network. For example, the user has a video conference (application A), for which an image of better quality is needed, whereby an attempt is made to increase the data transfer rate. The traffic situation in the packet-switched network can also become such that the network cannot support the data transfer rate specified for the video conference, whereby the quality of service allocated to it must be changed or the video conference must even be disconnected.

In a method according to a preferred embodiment of the invention, the changing of the quality of service caused by the user or the application can be carried out substantially in the same manner as establishing the application connection, which has been described in more detail earlier in this specification. The most essential difference is the fact that all information about the quality of service profile and the data transfer filter parameters need not be sent, but only the information which will be changed. It the data transfer filter is removed, it is sufficient to send only the data transfer filter ID, without the filter parameters. Information about changing the quality of service is transmitted via the socket application programming interface SAPI to the control block QMOC. Alternatively, a change made by the user can be transferred directly to the control block QMOC. On the basis of the changed information, a PDP context, which is as suitable as possible for the changed situation, is selected. After that, the new/selected PDP context is activated or modified, if necessary. If the PDP context is changed, updating for the new situation is also carried out in the PDP context, which was selected for the application connection before the PDP context was changed. Then the measure to be taken is mainly to reduce the bit rate of this PDP context.

It can be assumed, for instance, that in the Telnet application G the traffic class is changed from the third to the fourth traffic class. The control block QMOC detects that the PDP context corresponding to this fourth class, the ninth PDP context PDP9 in this example, is active, whereby this PDP context is selected for the data flows of the Telnet application. In this case, no changes need be made in this ninth PDP context PDP9, because the bit error rate, the delay class and the bit rate correspond to the quality of service wanted. However, a data transfer filter must be specified for this application, because earlier the default PDP context was selected for this application. Then the control block QMOC transmits information about the data transfer filter to the packet classification block PAC of the mobile terminal and the gateway GPRS support node 3G-GGSN of the packet-switched network. In this case, no changes need be made in the eigth PDP context PDP8 either, because the bit rate corresponds to the best effort.

As another example, the bit rate 25 kbit/s of the voice application B is changed to 15 kbit/s. Other parameters having an effect on the quality of service are not changed. Because only the bit rate is changed, the same PDP context (PDP2) can be used. Then a new bit rate is calculated as the sum of the bit rates of the applications, for whose data flows this second PDP context PDP2 has been selected. Other parameter changes are not needed. Changes need not be made in the data transfer filters, because the same PDP context remains. After this, the control block QMOC performs the modification of the PDP context, but the data transfer filter parameters need not be transmitted.

In the third example, the traffic class of the data signal transmission application E of a multimedia application is changed from the second to the first traffic class. Because in the data transfer system of this example, the bit error rate does not meet the value wanted for the application, 10e-5, the closest possible value, 10e-4 in this case, is selected. If no target value has been given for the delay in the change request, preferably the poorest delay class (=2) is selected. The control block QMOC detects that in the first traffic class the PDP context corresponding to the requirements, the fourth PDP context PDP4 in this example, is already active. In this case, the bit rate of the fourth PDP context PDP4 must be changed so that it corresponds to the new situation. The bit rate required is the sum of the bit rates of the application connections (E and D) using this fourth PDP context: 40 kbit/s. In addition, a data transfer filter is specified for this application in the fourth PDP context PDP4. Then the control block QMOC transmits information about the data transfer filter to the packet classification block PAC of the mobile terminal and the gateway GPRS support node 3G-GGSN of the packet-switched network. In this case, the sixth PDP context PDP6 is preferably deactivated, because after the change no application uses this PDP context PDP6. In connection with the deactivation, the data transfer filters specified in the PDP context to be deactivated are also removed.

One more example is a situation in which the bit error rate of the video signal transmission application A of a multimedia application is changed. The bit error rate before the change is, for instance, 10e-4 and it is changed to the value 10e-3. The first traffic class is retained for the connection, and other quality of service parameters are not changed, either. Because in the situation illustrated by this example, no PDP context in which the bit error rate meets the requirements of the application is active, the next attempt is to activate a new PDP context. The control block QMOC detects that in the first traffic class the PDP context corresponding to the requirements is the first PDP context PDP1. Then the control block QMOC selects this first PDP context PDP1 for this application A. In addition, the control block QMOC specifies a data transfer filter for this application. The same parameters as those used in the PDP context PDP2 before the change can be used in the data transfer filter. The PDP context is activated in the packet-switched network. The control block QMOC also transmits information about the data transfer filter to the packet classification block PAC of the mobile terminal and the gateway GPRS support node 3G-GGSN of the packet-switched network. In this case, changes are made in the second PDP context PDP2 (the bit rate is reduced), because after the change, the video signal transmission application A of the multimedia application does not use this PDP context PDP2, but the applications B and C still use it.

The need to change the quality of service can also come from the packet-switched network. Then the method according to a preferred embodiment of the invention is as follows (FIG. 4b). In the serving GPRS support node 3G-SGSN, the session management block SM, for instance, detects that the packet-switched network is overloaded with traffic, whereby an attempt is made to restrict at least part of the data transmission. Then the session management block SM determines which PDP context(s) are changed to remove the overload (412) and selects a new quality of service profile. The serving GPRS support node 3G-SGSN sends a request to the radio network RAN for changing the bearer to correspond to the new quality of service profile of the PDP context (arrow 413). The radio access network RAN selects a new radio access bearer corresponding to the requested quality of service, if possible (block 414) and transmits information of the identifier of this radio access bearer and the quality of service to the serving GPRS support node 3G-SGSN (arrow 415).

The serving GPRS support node 3G-SGSN sends a request for updating the PDP context to the gateway GPRS support node 3G-GGSN (arrow 416). The gateway GPRS support node 3G-GGSN sets the PDP context (block 417) and returns information about the negotiated quality of service to the serving GPRS support node 3G-SGSN (arrow 418).

The serving GPRS support node 3G-SGSN sends information about the changing of the PDP context to the mobile terminal MT (arrow 419). In the mobile terminal MT, the changes of the PDP context are transmitted to the compatibility protocol block L3CE and the control block QMOC (block 420). The mobile terminal MT sends a message about accepting the change of the PDP context to the serving GPRS support node 3G-SGSN (arrow 421). However, the situation of an application may change so that the changed PDP context no more corresponds to the quality of service specified for the application. Information about changing the quality of service of the application is transmitted to the control block QMOC. On the basis of the changed information, a PDP context, which is as suitable as possible for the changed situation, is selected. After that, the new/selected PDP context is activated or modified, if necessary. This is illustrated by blocks 422 and 423 in FIG. 4b.

The present invention is not limited to the above described embodiments only, but its details can be modified without departing from the scope defined by the attached claims.

What is claimed is:

1. A method for optimising the transfer of information between one or more applications run in a mobile terminal (MT) and a packet-switched network (NW), in which packet-switched network (NW) there are at least two PDP contexts (PDP1–PDP9) available, which PDP contexts have at least partly different data transfer properties, whereby said PDP contexts (PDP1–PDP9) can provide at least partly different qualities of service for the transmission of information, and in which method at least one application connection is established for at least one of said applications, for which application connection a quality of service is specified, and one of said PDP contexts (PDP1–PDP9) is selected for the application connection, characterised in that when the quality of service specified for the application connection of the application changes, it is examined on the basis of the properties of the PDP contexts (PDP1–PDP9) available in the packet-switched network (NW) which of said PDP contexts (PDP1–PDP9) is suitable for use by the application connection with the changed quality of service, and the one of the PDP contexts (PDP1–PDP9) the data transfer properties of which are closest to the changed quality of service is selected for the application connection.

2. A method according to claim 1, characterised in that one of said PDP contexts (PDP1–PDP9) is selected as the default PDP context (PDP8), whereby said default PDP context (PDP8) is selected for the application connection, if no quality of service is specified for the application connection.

3. A method according to claim 1, characterised in that one of said PDP contexts (PDP1–PDP9) is selected as the default PDP context (PDP8), whereby said default PDP context (PDP8) is selected for the application connection, if the data transfer properties of no other PDP context (PDP1–PDP7, PDP9) available do not correspond to the quality of service specified for the application connection.

4. A method according to claim 1, characterised in that at least one data transfer filter is formed for the application connection, in which data transfer filter information about the PDP context (PDP1–PDP9) selected for the application connection is saved.

5. A method according to claim 4, in which information is transferred in at least one data flow in an application connection, characterised in that an identifier is specified for the data flow of the application connection, whereby at least said identifier is saved in said data transfer filter.

6. A method according to claim 1, characterised in that at least two different traffic classes (TC1–TC4) are formed in the packet-switched network, in which traffic classes the data transfer properties are at least partly different, that at least one PDP context is formed in said traffic classes, and that the quality of service specified for the application connection includes information about said traffic class (TC1–TC4), whereby a PDP context is selected for the application connection from the PDP contexts of the traffic class (TC1–TC4) specified for the application connection.

7. A method according to claim 1, characterised in that at least the bit rate of data transfer is used for specifying the quality of service, whereby the PDP context (PDP1–PDP9) is not changed when the bit rate specified for the application connection is changed.

8. A method according to claim 1, characterised in that at least the bit error ratio of data transfer is used for specifying the quality of service, whereby the PDP context (PDP1–PDP9) is changed when the bit error ratio specified for the application connection is changed.

9. A method according to claim 1, characterised in that at least the data transfer delay is used for specifying the quality of service, whereby the PDP context (PDP1–PDP9) is changed when the delay specified for the application connection is changed.

10. A method according to claim 1, characterised in that for changing the PDP context (PDP1–PDP9), the specifications of the changed quality of service of the application connection are compared to the qualities of service which can be achieved with the PDP contexts available (PDP1–PDP9) for selecting a PDP context (PDP1–PDP9), which corresponds to the changed quality of service of the application connection as closely as possible.

11. A method according to claim 10, characterised in that in the method it is also examined whether the selected PDP context (PDP1–PDP9) is active, whereby if the selected PDP context (PDP1–PDP9) is active, the status of the selected PDP context (PDP1–PDP9) is updated on the basis of the quality of service parameters of the application connection, or if the selected PDP context (PDP1–PDP9) is not active, the selected PDP context (PDP1–PDP9) is activated and the status of the selected PDP context (PDP1–PDP9) is set on the basis of the quality of service parameters of the application connection.

12. A data transfer system comprising a mobile terminal (MT), which incorporates means (CONTROL, MEM) for running one or more applications, a packet-switched network (NW), optimising means for optimising the transmission of information between the application and the packet-switched network (NW), in which packet-switched network there are formed at least two PDP contexts (PDP1–PDP9), which have at least partly different data transfer properties, whereby said PDP contexts (PDP1–PDP9) have at least partly different qualities of service, and which data transfer system also comprises means (QMOC, MT, 3G-GGSN) for establishing at least one application connection for at least one of said applications, for which application connection a quality of service has been specified, which quality of service has been formed of a set of data transfer parameters, and means (QMOC) for selecting one of said PDP contexts (PDP1–PDP9) for each application connection, characterised in that said optimising means comprise:

examining means (3G-SGSN, RAN) for finding out the properties of the PDP contexts (PDP1–PDP9) available in a packet-switched network (NW), and a control block (QMOC) for receiving change information about the quality of service specified for the application connection, and for comparing the changed quality of service to the properties of the PDP contexts (PDP1–PDP9) available in the packet-switched network, whereby it is arranged that the PDP context selected for the use of the application connection with the changed quality of service specified for the application connection is the PDP context (PDP1–PDP9) the data transfer properties of which are closest to the changed quality of service specified for the application connection.

13. A data transfer system according to claim 12, characterised in that one of said PDP contexts (PDP1–PDP9) has been selected as the default PDP context (PDP8), whereby it is arranged that said default PDP context (PDP8) is selected for the application connection, if no quality of service has been specified for the application connection.

14. A data transfer system according to claim 12, characterised in that one of said PDP contexts (PDP1–PDP9) has been selected as the default PDP context (PDP8), whereby it is arranged that said default PDP context (PDP8) is selected for the application connection, if the data transfer properties of any other PDP context (PDP1–PDP7, PDP9) available do not correspond to the quality of service specified for the application connection.

15. A data transfer system according to claim 12, characterised in that it comprises means (QMOC) for forming at least one data transfer filter for the application connection, and saving means (MEM) for saving information about the PDP context (PDP1–PDP9) selected for the application connection.

16. A data transfer system according to claim 15, which comprises means (NLP, PAC) for transferring information of the application connection in at least one data flow, characterised in that a unique identifier is specified for said data transfer flow, whereby it is arranged that at least said identifier is saved in said data transfer filter.

17. A data transfer system according to claim 12, characterised in that at least two different traffic classes (TC1–TC4) have been formed in the packet-switched network, in which traffic classes the data transfer properties are at least partly different, that at least one PDP context has been formed in each traffic class, and that the quality of service specified for the application connection includes information about said traffic class (TC1–TC4), whereby it is arranged that a PDP context is selected for the application connection from the PDP contexts of the traffic class (TC1–TC4) specified for the application connection.

18. A data transfer system according to claim 12, characterised in that it comprises means (SAPI) for converting the information of the application connection into packets to be transmitted in the data transfer system, and means (PAC) for connecting packets of the data flow to the PDP context selected for the application connection.

19. A data transfer system according to claim 12, characterised in that the control block (QMOC) comprises means for converting the data transfer parameters of the quality of service specified for the application connection into parameters according to the data transfer properties of the PDP contexts (PDP1–PDP9) of the packet-switched network (NW1).

20. A mobile terminal (MT) comprising means (CONTROL, MEM) for running one or more applications, data transfer means (RF) for transmitting information between the mobile terminal and a packet-switched network (NW), optimising means (QMOC) for optimising the transfer of information between the application and the packet-switched network (NW), in which packet-switched network there are formed at least two PDP contexts (PDP1–PDP9), which have at least partly different data transfer properties, whereby said PDP contexts (PDP1–PDP9) have at least partly different qualities of service, and which mobile terminal (MT) also comprises means (QMOC) for establishing at least one application connection for at least one of said applications, for which application connection a quality of service has been specified, and means (QMOC) for selecting one of said PDP contexts (PDP1–PDP9) for each data flow of an application connection, characterised in that said optimising means comprise means (SAPI, KB, DD, QMOC) for changing the quality of service specified for the application connection of an application by changing the PDP context (PDP1–PDP9) selected for the application connection for another PDP context (PDP1–PDP9) available in the packet-switched network.

* * * * *